US011148141B2

(12) United States Patent
Seitter et al.

(10) Patent No.: US 11,148,141 B2
(45) Date of Patent: Oct. 19, 2021

(54) SOLID-STATE, MULTI-WELL PLATE READER

(71) Applicant: Cerillo, LLC, Charlottesville, VA (US)

(72) Inventors: Kevin Seitter, Charlottesville, VA (US); Kristin Schmidt, Charlottesville, VA (US); Thomas Moutinho, Jr., Charlottesville, VA (US)

(73) Assignee: Cerillo, Inc., Charlottesville, VA (US)

( * ) Notice: Subject to any disclaimer, the term of this patent is extended or adjusted under 35 U.S.C. 154(b) by 0 days.

(21) Appl. No.: 16/948,213

(22) Filed: Sep. 9, 2020

(65) Prior Publication Data
US 2021/0107007 A1  Apr. 15, 2021

Related U.S. Application Data

(60) Provisional application No. 62/897,576, filed on Sep. 9, 2019.

(51) Int. Cl.
*B01L 3/00* (2006.01)
*G01N 21/3563* (2014.01)

(52) U.S. Cl.
CPC ... *B01L 3/502784* (2013.01); *B01L 3/502715* (2013.01); *G01N 21/3563* (2013.01); *B01L 2200/10* (2013.01); *B01L 2200/12* (2013.01); *B01L 2300/041* (2013.01); *B01L 2300/0654* (2013.01); *B01L 2300/0819* (2013.01)

(58) Field of Classification Search
CPC ......... B01L 3/502784; B01L 3/502715; B01L 2200/12; B01L 2200/10; B01L 2300/041; B01L 2300/0654; B01L 2300/0819; G01N 21/3563
See application file for complete search history.

(56) References Cited

U.S. PATENT DOCUMENTS

| | | | |
|---|---|---|---|
| 6,097,025 | A | 8/2000 | Modlin et al. |
| 9,156,010 | B2 | 10/2015 | Colston, Jr. et al. |
| 9,885,652 | B2 | 2/2018 | Papin et al. |
| 2005/0112634 | A1 | 5/2005 | Woudenberg et al. |
| 2010/0248387 | A1 | 9/2010 | Gambini et al. |
| 2010/0248981 | A1 | 9/2010 | Shirazi |
| 2011/0220777 | A1* | 9/2011 | Clinton ............ G01N 33/54366 250/208.1 |
| 2012/0045826 | A1 | 2/2012 | Yantz et al. |
| 2015/0260642 | A1* | 9/2015 | Papin .................. G01N 21/253 506/39 |

OTHER PUBLICATIONS

PCT/US2020/070510 International Search Report dated Nov. 24, 2020 (corresponding PCT application).
PCT/US2020/070510 International Written Opinion dated Nov. 24, 2020 (corresponding PCT application).

* cited by examiner

*Primary Examiner* — Sally A Merkling
(74) *Attorney, Agent, or Firm* — Vance Intellectual Property, PC

(57) ABSTRACT

The present invention generally relates to a solid-state, multi-well plate reader including an emitter assembly having a plurality of emitters and a receptor assembly having a plurality of receptors, where the positions of these assemblies are not fixed relative to each other but are temporarily aligned for measurement by way of two alignment trays.

24 Claims, 10 Drawing Sheets

SOLID-STATE, MULTI-WELL PLATE READER

STATEMENT REGARDING FEDERALLY SPONSORED RESEARCH OR DEVELOPMENT

This invention was made with government support under SBIR 1647768 and SBIR 1831082 awarded by the National Science Foundation. The government has certain rights in the invention.

FIELD OF THE INVENTION

The present invention generally relates to a solid-state, multi-well plate reader including an emitter assembly having a plurality of emitters and a receptor assembly having a plurality of receptors, where the positions of these assemblies are not fixed relative to each other but are temporarily aligned for measurement by way of two alignment trays.

BACKGROUND OF THE INVENTION

A plate reader is a device capable of measuring the optical properties of samples contained in a multi-well plate. A plate reader does this by measuring the transmission, reflection, refraction, absorption, or emission of light at particular wavelengths through or by said samples. Example measurements include optical density, turbidity, colorimetry, fluorescence, and luminescence. Typical applications are in chemistry, biochemistry, biology, and microbiology.

Any plate reader must have, at minimum: one or more light-emitting elements ("emitters"); one or more light-directing elements; one or more light-detecting elements ("detectors"); a positioning apparatus to align the multi-well plate with said emitters, detectors, and/or light-directing elements.

Most existing plate readers use a wide-spectrum white light source, such as a halogen bulb, to generate light for emission. Usually, this light is then passed through a monochromatic optical filter, often a replaceable one of the user's selection, to select a single emission wavelength for measurement. Some plate readers use a device called a monochromator instead of a monochromatic filter; a monochromator consists of a prism to separate the white light into its component wavelengths, followed by a moveable slit used to select any arbitrary wavelength of light from the resulting continuous spectrum. In both types of plate readers, the now-monochromatic light is passed through light-directing components to shine on the sample to perform the emission component, when necessary, of the above-mentioned measurements.

To perform the light detection necessary to complete the above-noted measurements, existing plate readers employ a variety of technologies. Light is frequently first passed through another light-directing element. In some plate readers, this light may be passed through an additional monochromatic filter or monochromator. (Plate readers with an emission and detection monochromator are said to be "dual-monochromator" systems.) The light finally reaches a detector of custom manufacture to be read in a pre-programmed protocol. This measurement is passed through an algorithm, based on the user's selections and what measurement is to be performed, to produce the desired output for the user.

The disadvantages of this type of system are numerous and relate primarily to the device's size, complexity, and cost. Dedicated laboratory space must exist to house a large instrument in a permanently fixed position for a plate reader to be a feasible inclusion in a research lab. It is difficult or impossible to include a plate reader in a specialized environment such as an incubator or anaerobic chamber due to size constraints. Additionally, most plate readers must be maintained via expensive service contracts with outside vendors due to their complexity, and repairs often require the instrument to be taken offline for a significant stretch of time which could otherwise be used for experimentation. Finally, due to the cost associated with the traditional plate reading mechanisms, a plate reader is often prohibitively expensive for a laboratory that would otherwise benefit from one, and it is extremely rare to find more than one in a single lab. This creates resource bottlenecks and degrades the quality of research available to conduct with this otherwise highly efficient and precise technology.

Small plate readers have been contemplated (e.g., see U.S. Pat. No. 9,885,652), but none have yet been described which allow easy insertion and removal of a plate, adequately and reproducibly align the multi-well plate for measurement, and/or block ambient light from interfering with the measurement.

Thus, there is an ongoing need for a plate reader that solves one or more of the above-noted difficulties.

SUMMARY OF THE INVENTION

In an aspect, the present invention provides a novel, solid-state, multi-well plate reader, comprising: two alignment trays, an emitter assembly having a plurality of emitters, a receptor assembly having a plurality of receptors, and a boundary assembly having one or more elements that house the emitter and receptor assemblies, where the positions of the emitter and receptor assemblies are not fixed relative to each other but are temporarily aligned for measurement by way of the two alignment trays.

These and other aspects, which will become apparent during the following detailed description, have been achieved by the inventors' discovery of a novel, solid-state, plate reader that is internally alignable and reproducibly aligns a multi-well sample plate for measurements.

BRIEF DESCRIPTION OF THE DRAWINGS

FIG. 2A is a cutaway view of the plate reader containing a 96 well plate, wherein the reader is shown in the closed position. FIG. 2B is a cutaway view of the plate reader containing a 96 well plate, wherein the reader is in the open position.

FIG. 3A shows a partial, internal view of the open plate reader from the front, wherein a back alignment ridge, a back alignment crevice, and front alignment pins are visible. FIG. 3B shows a partial cutaway view of a back alignment ridge on the alignment tray that is in alignment with a receiving channel on the second tray.

DETAILED DESCRIPTION OF THE PREFERRED ASPECTS

Figure 1:
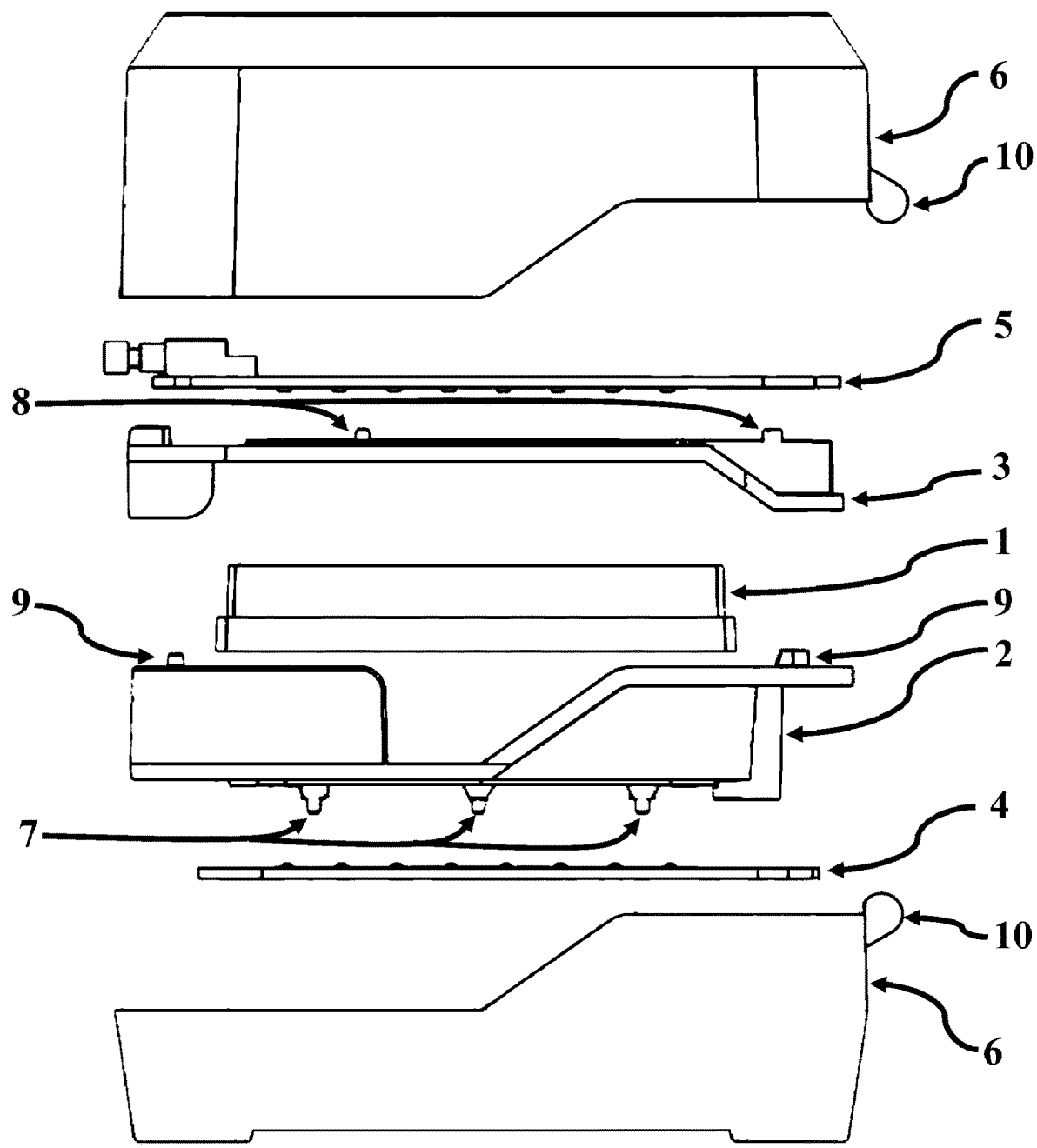
FIG. 1 shows an exploded view of the plate reader, including a multi-well plate.

Exemplary aspects of the present invention are described with reference to the figures, where appropriate. Although the following detailed description contains many specifics for purposes of illustration, a person of ordinary skill in the art will appreciate that variations and alterations to the following details are within the scope of the invention. Accordingly, the following aspects of the invention are set forth without any loss of generality to, and without imposing limitations upon, the claimed invention.

The present invention provides a solid-state, multi-well plate reader, comprising: two alignment trays, an emitter assembly having a plurality of emitters, a receptor (detector) assembly having a plurality of receptors, and a boundary assembly housing the trays and emitter and receptor assemblies, wherein the positions of the emitter and receptor assemblies are not fixed relative to each other but are temporarily aligned for measurement by way of the two alignment trays. The alignment trays serve to secure a multi-well sample plate and optically align the emitter and receptor assemblies with the plate and each other in a reproducible manner. This temporary, but reproducible, alignment allows the precise optical measurement of samples within the multi-well plate while enabling easy access to the plate and flexible storage when not in use.

The following table provides a description of the number structures in FIGS. 1-8.

| # | Structure |
|---|---|
| 1 | Multi-well plate |
| 2 | Alignment tray |
| 3 | Second tray |
| 4 | Emitter assembly |
| 5 | Receptor assembly |
| 6 | Boundary assembly |
| 7 | Physical coupling (from 2 into 4) |
| 8 | Physical coupling (from 3 into 5) |
| 9 | Physical coupling (for temporary coupling between 2 and 3) |
| 10 | Durable connection (between two boundary assemblies (6)) |
| 11 | Force-producing element on 2 |

Thus, in an aspect, the present invention provides a novel multi-well plate reader, comprising:
a an alignment tray (2) configured to securely fasten a multi-well plate (e.g., a 96 well plate (1)), the alignment tray, comprising:
(i) at least one force-producing element (11) configured to align the multi-well plate (1) to a single reference point (e.g., a corner, edge, or face of the alignment tray); and,
(ii) at least one physical coupling element (9);
b an emitter assembly (4), physically coupled to and in a fixed position relative to the alignment tray (2), the emitter assembly (4) comprising: a plurality of electromagnetic emitters arranged to place the emissions of one or more of the emitters in optical alignment with each single well of the multi-well plate;
c a second tray (3), comprising: at least one physical coupling element (9) that corresponds with the at least one physical coupling element (9) of the alignment tray (2), such coupling element enabling temporary alignment during the plate reader operation;
d a receptor assembly (5), physically coupled to and in a fixed position relative to the second tray (3), the receptor assembly, comprising: a plurality of electromagnetic receptors arranged to place one or more of the receptors in alignment with electromagnetic emission that exits each single well of the sample plate; and
e a boundary assembly, comprising: a plurality of elements (6) surrounding the trays and assemblies, the boundary assembly being designed to prevent inward leakage of external emissions during operation of the plate reader;
wherein:
each emitter is operable to transmit electromagnetic radiation to one or more of the receptors;
the alignment tray (2) and second tray (3) are configured to move relative to each other when the plate reader is not in use; and
both the emitter assembly (4) and receptor assembly (5) are static regarding one another and the sample plate during operation of the plate reader.

Multi-well sample plate and multi-well plate are used interchangeably.

A multi-well sample plate is typically a 96-well plate. A 96-well sample plate is a plate having 96 individual wells. The dimensions of the plate are such that the plate fits on the alignment tray by itself or with one or more spacers to engage the alignment plate. Other examples of the number of wells include 24, 12, and 6.

Figure 4:
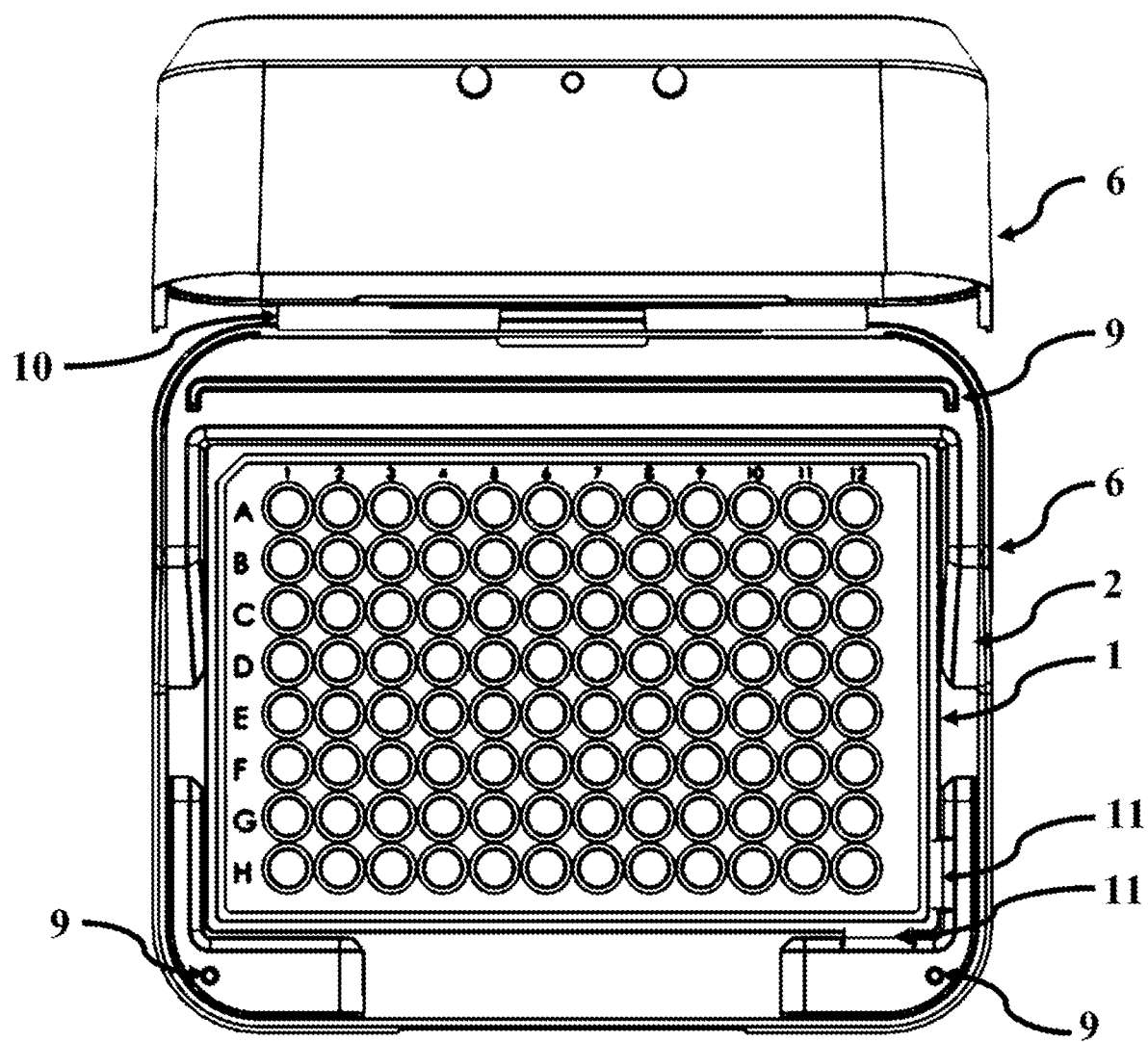
FIG. 4 shows a top down view of the plate reading containing a 96-well place, wherein the reader is in an open position. The open position in FIG. 4 shows the front of the top half of the reader.

As shown in FIG. 4, the alignment tray is configured to securely fasten a multi-well sample plate (e.g., a 96-well plate). Secure fastening of the sample plate after insertion in the plate reader prevents motion thereof. This allows for movement (e.g., shaking) of the plate reader without jeopardizing the integrity of the alignment of the emitters, wells, and receptors.

The at least one force-producing element (11) (see FIG. 4) is configured to align the sample plate to a single reference point (e.g., a corner, edge, or face of the alignment tray). For example, if the force producing element(s) (11) is(are) located at or near one corner of the alignment tray, then the reference point is typically the opposite corner (the element(s) forces the plate into the opposite corner) (see FIG. 4). Forcing the multi-well plate into a single, known position on the alignment tray allows for consistent alignment of the emitters and receptors with the plate. In another aspect, there are a plurality of force-producing elements. For example, there are 2, 3, 4, 5, 6, 7, 8, 9, or 10 force-producing elements. Examples of force-producing elements include a spring-like element (e.g., a springy tab (see FIGS. 2A-B and 4) or a flexible edge), an angular edge (e.g., the sample plate snaps under the angle and is forced away from it), or a combination thereof.

In another aspect, the alignment tray (2), further comprises: four corner pieces, two front corner pieces and two rear corner pieces (see FIG. 4). The corner pieces are attached to the alignment tray or formed as a part of the tray (continuous piece). The corner pieces are typically L-shaped (they extend around both sides of the corner). The corner pieces are typically equivalent in height to each other and typically similar in height to the multi-well plate for which the reader is designed or slightly taller (to allow for space between the second tray and/or second housing and the top of the multi-well plate). In another aspect, the rear corner pieces are connected to form a rear wall (see FIG. 4).

In another aspect at least one of the front corner pieces, comprises: the at least one force-producing element (11)(see FIG. 4, bottom-right corner). For example, one of the front corner pieces, comprises: the at least one force-producing element (11). In another aspect, the at least one force-producing piece, comprises: a pair of springy tabs facing inward (see FIGS. 2A-B). These tabs, when a multi-well plate is inserted into the reader, force the place into the opposite back corner.

In another aspect, the plate reader, further comprises:
f an adapter.
The adapter is configured to be secured to an apparatus (e.g., shaker) suitable to agitate the components (e.g., liquids) contained in the wells of the multi-well sample plate. An example of such apparatus includes a shaker plate. The adapter is also configured to secure the plate reader to the apparatus to allow for agitation (e.g., shaking or circular motion). This securing is accomplished via friction (e.g., the plate reader rests in or is pushed or pressed into the adapter or the adapter is tightened onto the plate reader), mechanical force (e.g., one or more screws or bolts are used to attach the plate reader the adapter), magnetic force (each of the plate reader and adapter comprise: a magnetic, these magnetics attract one another with sufficient force to secure the plate reader to the adapter) or a combination thereof.

Figure 2A:
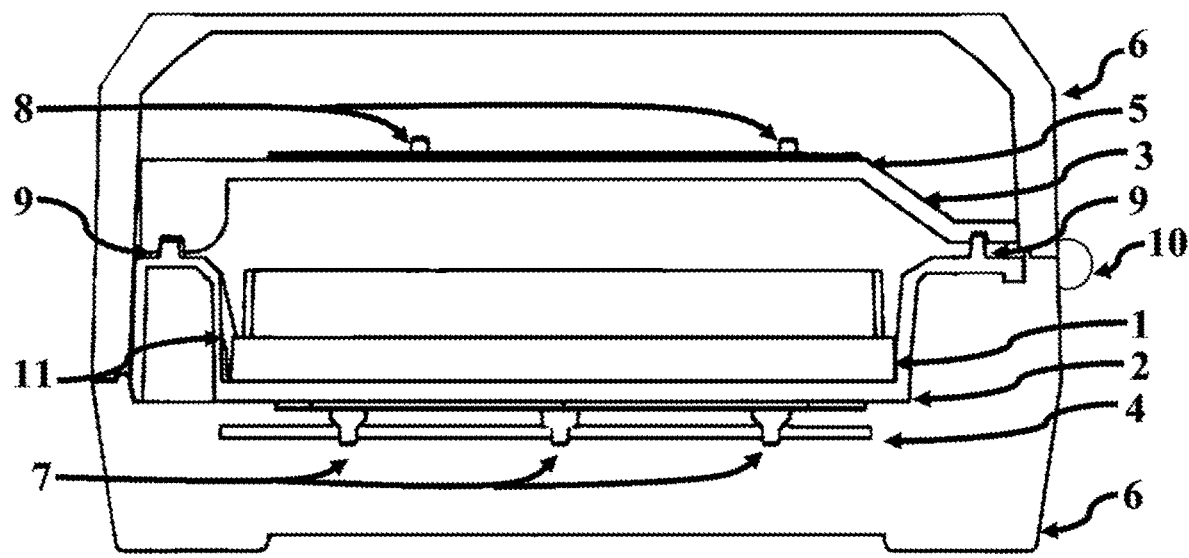
FIGS. 2A-B show cutaway views of the plate reader containing a multi-well plate.
Figure 2B:
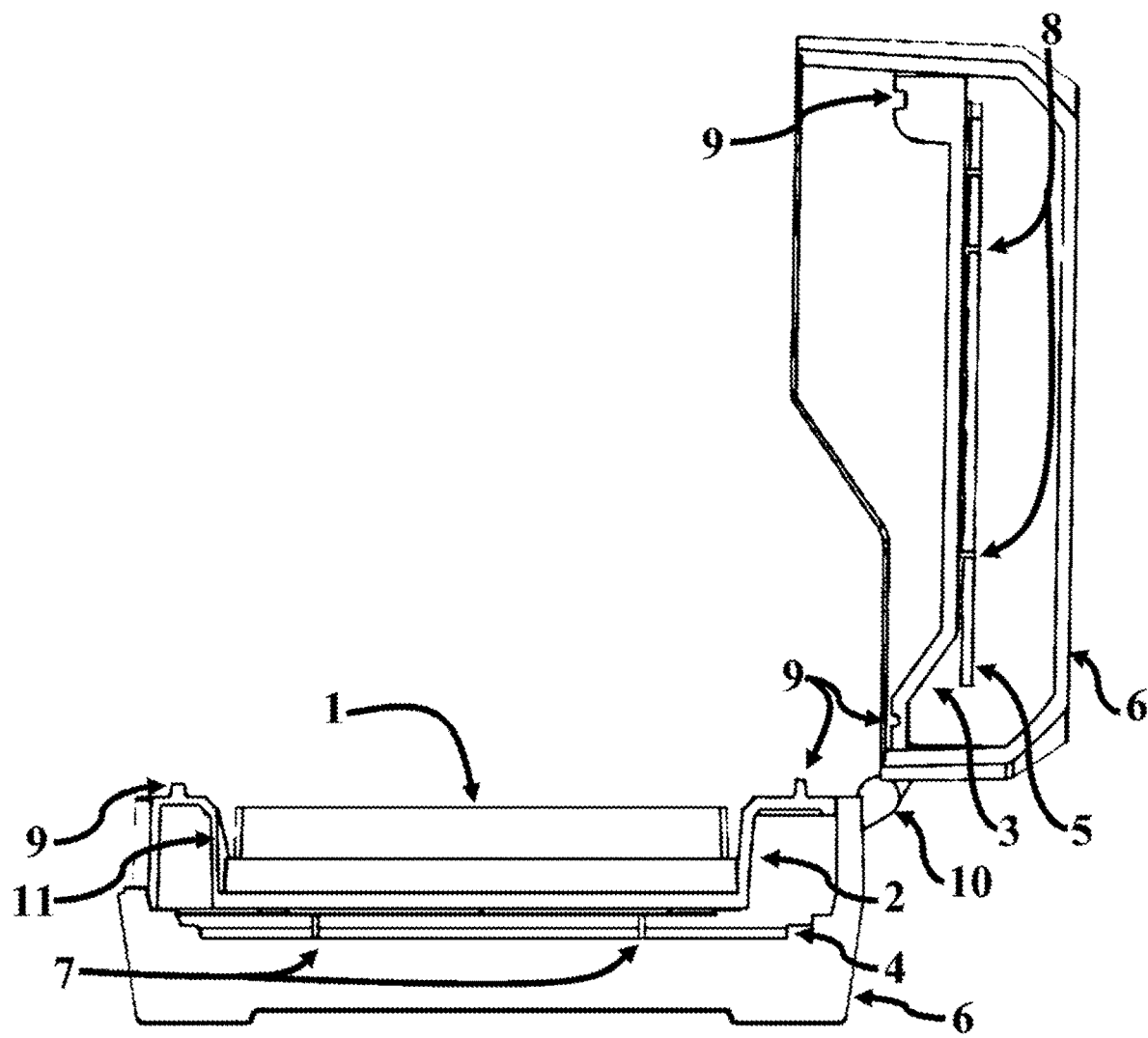
Figure 3A:
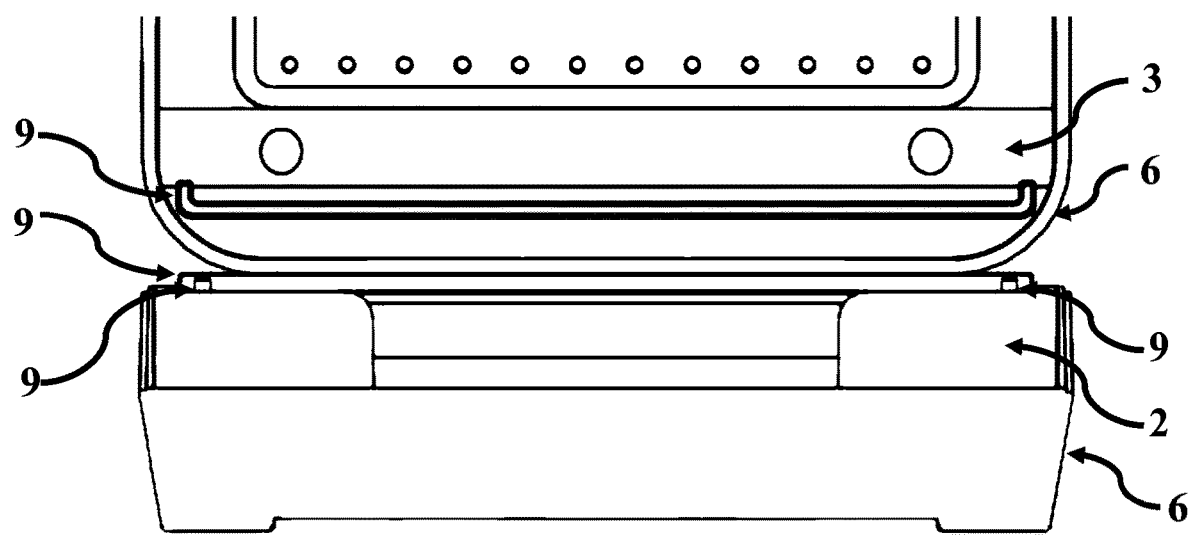
FIGS. 3A-B show two alignment tray and second tray physical coupling elements.
Figure 3B:
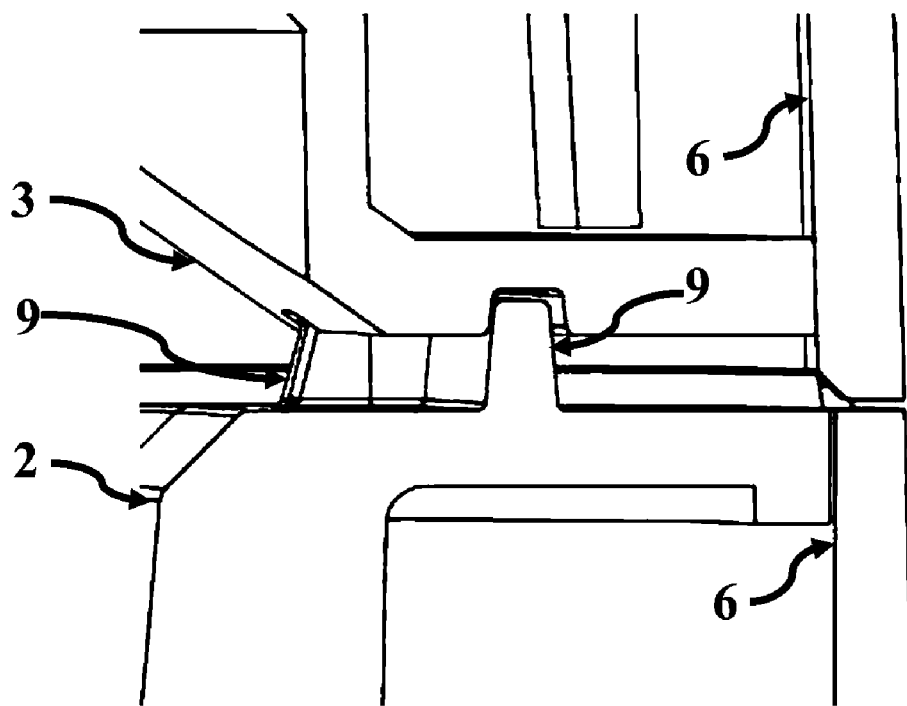
Figure 3C:
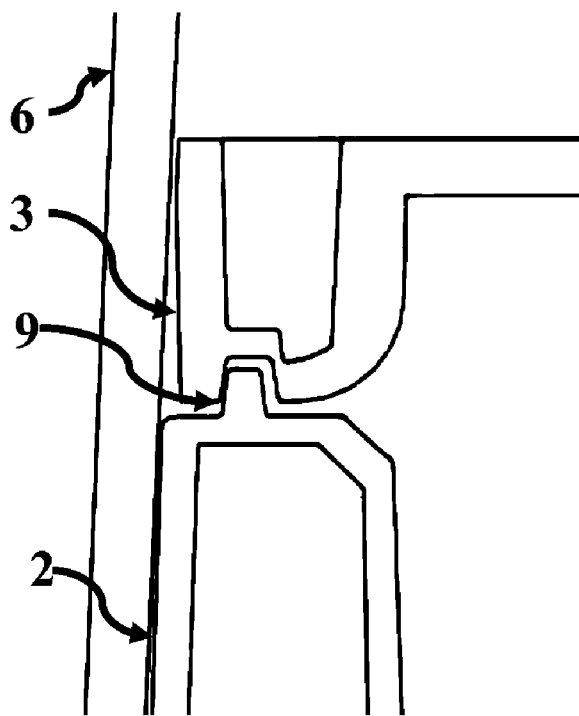
FIG. 3C shows a partial cutaway view of a pin on the front of the alignment tray inserted into the second tray.

As noted above, the alignment tray (2) and second tray (3) are configured to move relative to each other when not in use (see FIGS. 2A-B). However, for the plate reader to operate, the emitter and receptor assemblies must be properly aligned and static during operation of the plate reader. The plate reader of the present invention achieves this alignment and static positioning via the coupling elements (9) of the alignment tray and second tray (see FIGS. 1, 2A, and 3A-C). These elements correspond with one another for temporary alignment (and static positioning of the assemblies) during the plate reader operation.

The at least one physical coupling element (9) of the alignment tray (2) is configured to couple with the at least one physical coupling element (9) of the second tray (3). The coupling occurs when the plate reader is in a closed position (e.g., after the multi-well plate has been inserted) (see FIG. 2A). In an aspect, the at least one physical coupling element (9) of the alignment tray (2), comprises: a protrusion on the upper edge of the alignment tray (the edge facing the second tray, see FIG. 2B). Protrusions include ridges, pins, posts, knobs, other physical devices that extend away from the alignment tray, and combinations thereof. In an aspect, the at least one physical coupling element (9) of the second tray (3), comprises: an intrusion on the lower edge of the second tray (the edge facing the alignment tray, see FIG. 2B). Intrusions include crevices, holes, slits, other openings configured to receive a protrusion from the alignment tray, and combinations thereof. In another aspect, the trays (2 and 3) comprise: a plurality of physical coupling elements (9). In another aspect, the alignment tray (2), comprises: a combination of pins and ridges and the second tray (3), comprises: a combination of crevices and holes that correspond to the coupling elements of the alignment tray (see FIGS. 2A-B and 3C). In another aspect, the corner pieces of the alignment tray (3), comprise a pin, the rear wall of the alignment tray comprises: a ridge, and the second tray, comprises: corresponding holes in its corners and crevice on its rear edge (see FIGS. 2A-B and 3A-B).

The boundary assembly (6)(see FIGS. 1, 2A-B, 4, 6A-B, ad 7) is designed to prevent inward leakage of external emissions during operation of the plate reader. Ambient light is a primary external emission that can introduce error in the operation of the plate reader. Thus, the boundary assembly is typically designed to exclude most ambient light.

In another aspect, the boundary assembly (6), comprises:
g a first housing that houses the alignment tray and emitter assembly (see FIG. 2B); and
h a second housing that houses the second tray and receptor assembly (see FIG. 2B).
The housings are configured to prevent inward leakage of external emissions (e.g., ambient light) during operation (the housings being closed together) of the plate reader (see FIGS. 6A-B).

The first housing, comprises: a closed bottom, open top, and sides and houses the alignment tray (2) and emitter assembly (4). The emitter assembly (4) is located inside the housing (6) between the alignment tray (2) and the closed bottom (see FIG. 1). In an aspect, the alignment tray (2) is located near the top of the first housing (6) and optionally forms a top to the first housing. Alternatively, the first housing (6) is called a bottom enclosure. The alignment tray (2) is physically coupled (e.g., via screws, bolts, etc.) to the first housing (see FIG. 5C). Optionally, the emitter assembly (4) is physically coupled to the first housing, typically via the same physical coupling as the alignment tray. In another aspect, mechanical tolerance is present within the physical coupling of the emitter assembly (4) to the first housing (2), thereby letting the alignment tray (2), instead of the first housing (6), control the positioning of the emitter assembly (4).

The second housing (6), comprises: a closed top, open bottom, and sides and houses the second tray (3) and receptor assembly (5). The receptor assembly (5) is located inside the housing (6) between the closed tray and the closed top (see FIG. 1). In an aspect, the second tray (3) is located near the middle of the second housing (6)(e.g., allows for a space in the reader between the multi-well plate and second tray). Alternatively, the second housing (6) is called a top enclosure. The second tray (3) is physically coupled (e.g., via screws, bolts, etc.) to the second housing. Optionally, the receptor assembly (5) is physically coupled to the second housing, typically via the same physical coupling as the second tray. In another aspect, mechanical tolerance is present within the physical coupling of the receptor assembly (5) to the second housing (6), thereby letting the second tray (3), instead of the second housing, control the positioning of the receptor assembly (5).

In another aspect, the alignment tray (2) and the second tray (3) are not durably coupled with each other. In this aspect, the trays are separable from one another (e.g., two independent pieces).

In another aspect, the alignment tray (2) and the second tray (3) are temporarily coupled to each other. For example, the trays are temporarily coupled by an external alignment structure (e.g., a clip or clamp or nut and bolt securing the trays together during plate reader operation).

In another aspect, the plate reader, further comprises:
i a durable connection (10) between the first and second housings that allows the housings to move relative to one another.
In this aspect, the housings are fixed to one another at one or more points, but they can still move relative to one another. An example of a durable connection (10) is a hinge (see FIGS. 2A-B). Another example is a plurality of rods (e.g., 2, 3, or 4) on which the second housing (top enclosure) can slide up (to allow for plate loading or removal) and down (to allow for reader operation) or a singular rod on which the second housing can swivel (rotate) away from the first house (to allow for plate loading) and back (to allow for reader operation).

In another aspect, the plate reader, further comprises:
j a locking mechanism configured to lock the first and second housings during operation of the plate reader.

Examples of a locking mechanism include a pair of magnets and a mechanical latch.

In another aspect, a first magnet is located in the first housing and a second magnet is located in the second housing. In another aspect, the alignment tray, comprises: the first magnet. In another aspect, the second housing, comprises: a button, comprising: the second magnet, wherein the button is slidably mounted in or on the second housing. Slidably mounted refers to the button being capable to being pressed into the plate reader or slide along the outside of the plate reader (not shown). In this aspect, when the reader is closed, the second housing is placed in contact with the first housing (e.g., a hinge is present, and the hinge is closed) and the first and second magnets attract one another and lock the plate reader. When the button is suppressed (pressed into the plate reader or slide to one side or the other), the magnetic attraction between the two magnets is broken and the plate reader is unlocked.

When the first and second housings are durably coupled (see FIG. 2B), the plate reader is configured to have enough mechanical tolerance (play) between the two housings of the boundary assembly to allow the physical coupling elements of the alignment and second trays (e.g., pins, ridge, holes, and crevice) to control the alignment between the alignment and second trays. This designed mechanical tolerance ensures that the trays are aligned, thereby ensuring that the emitters, multi-well plate, and receptors are aligned.

The emitter assembly (4) is physically coupled to the alignment tray (2). This physical coupling can be achieved a variety of ways including pins (7) projecting from the alignment tray through the emitter assembly (see FIGS. 5A-C), screws or bolts extending from the alignment tray through the assembly (or vice versa), clamps, glue(s), and a combination thereof. The physical coupling allows the emitter assembly (4) to be in a fixed position relative to the alignment tray (2). The fixed position allows for the alignment tray (2) to then optically align with the multi-well plate (1)(when present) (and receptors coupled to the second tray (3)).

In another aspect, the emitter assembly (4), comprises: electromagnetic emitters equivalent to the number of wells of the multi-well plate for which the plate reader is designed. The emitters are in optical alignment with the designed location of each single well of the multi-well plate. In another aspect, the emitter assembly (4), comprises: 96 emitters. In another aspect, for a 96 well plate, the emitter assembly (4), comprises: 96 emitters and each individual emitter is optically aligned the designed location of each of the 96 wells (when the plate is absent) or with each of the 96 wells when the plate is present.

The receptor assembly (5) is physically coupled to the second tray. This physical coupling can be achieved a variety of ways including pins (8) projecting from the second tray through the receptor assembly (similar to FIGS. 5A-C, also see FIG. 2A), screws or bolts extending from the alignment tray (2) through the assembly (5)(or vice versa), clamps, glue(s), and a combination thereof. The physical coupling allows the receptor assembly (5) to be in a fixed position relative to the second tray (3). The fixed position allows for the second tray (3) to then optically align with the multi-well plate (1)(when present) (and emitters coupled to the alignment tray (2)).

In another aspect, the receptor assembly (5), comprises: electromagnetic receptors equivalent to the number of wells of the multi-well plate (1) for which the plate reader is designed. The receptors are in electromagnetic emission alignment with the designed location of each single well of the multi-well plate. In another aspect, the receptor assembly (5), comprises: 96 receptors. In another aspect, for a 96 well plate, the receptor assembly (5), comprises: 96 receptors and each individual receptor is in electromagnetic emission alignment with the designed location of each of the 96 wells (when the plate is absent) or with each of the 96 wells when the plate (1) is present.

During operation of the plate reader, the electromagnetic emission that exits each single well of the multi-well plate (and is received by at least one receptor) includes emissions that enter and exit (e.g., emissions from an emitter) as well as emissions from the sample itself (e.g., luminescence).

In another aspect, each single emitter is configured to transmit electromagnetic radiation to a corresponding single receptor.

In another aspect, the emitters are light emitting diodes (LED).

In another aspect, each receptor is capable of measuring light in red, green, blue, and infrared channels, thereby allowing colorimetry (quantitative measurement of color) of incoming light. In another aspect, the receptors are digital photosensors with integrated analog-to-digital converters.

In another aspect, the emitter and receptor assemblies (4 and 5), further comprise: electromagnetic radiation channels. These channels prevent the emitters from emitting to and receptors from receiving from adjacent wells (wells to which they are not aligned). In another aspect, these channels are cylinders. The channels can be connected to their respective trays or assemblies. In another aspect, the trays (2 and 3), further comprise: electromagnetic radiation channels, which are connected thereto. In another aspect, the emitter and receptor assemblies (4 and 5), further comprise: electromagnetic radiation channels, which are connected thereto.

Figure 5A:
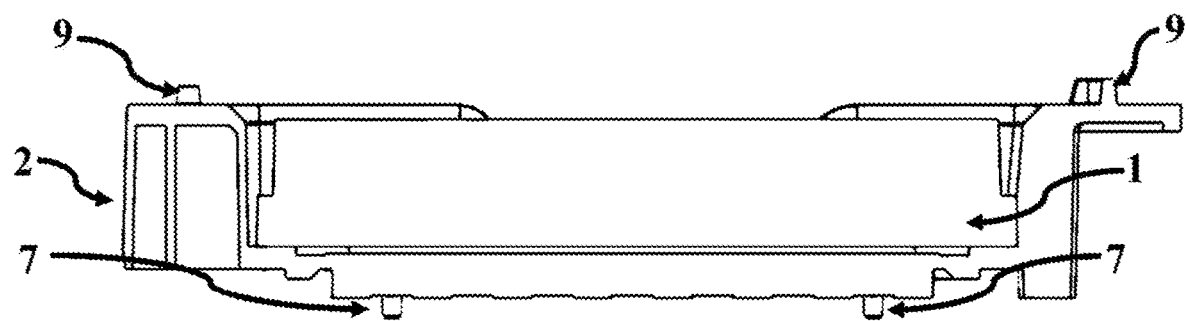
FIGS. 5A-C show a side view of the alignment tray with the pins configured to pass through the emitter assembly (5A), a top view of the emitter assembly with pinholes for coupling with the alignment tray being visible (5B), and a close-up cutaway side view of the alignment tray with a pin visibly passing through the emitter assembly (5C).
Figure 5B:
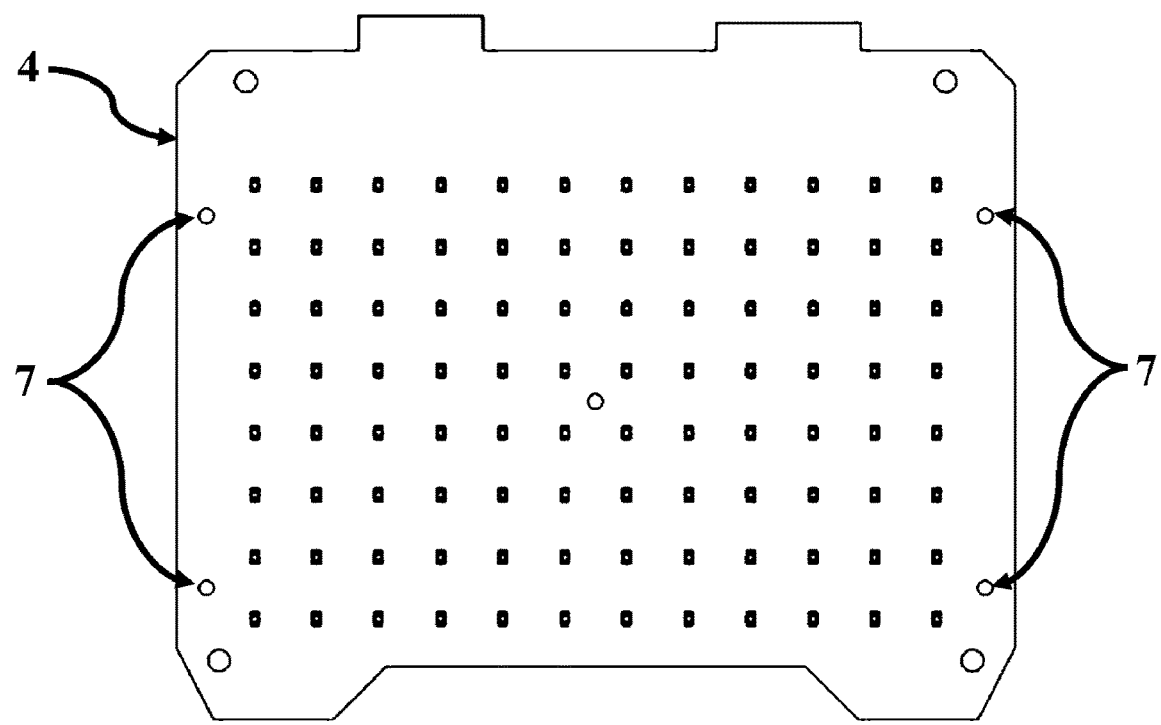
Figure 5C:
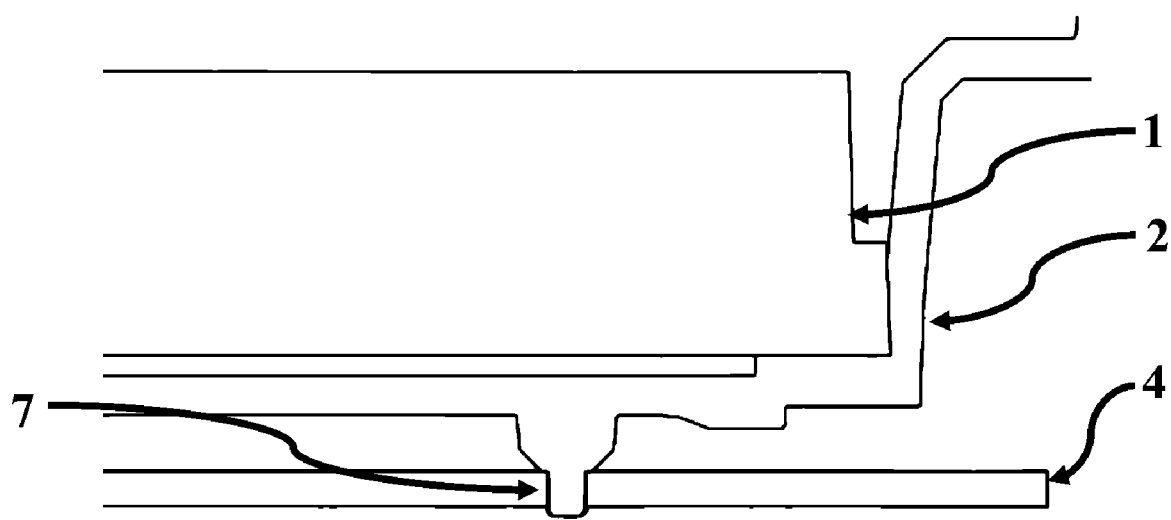
Figure 6A:
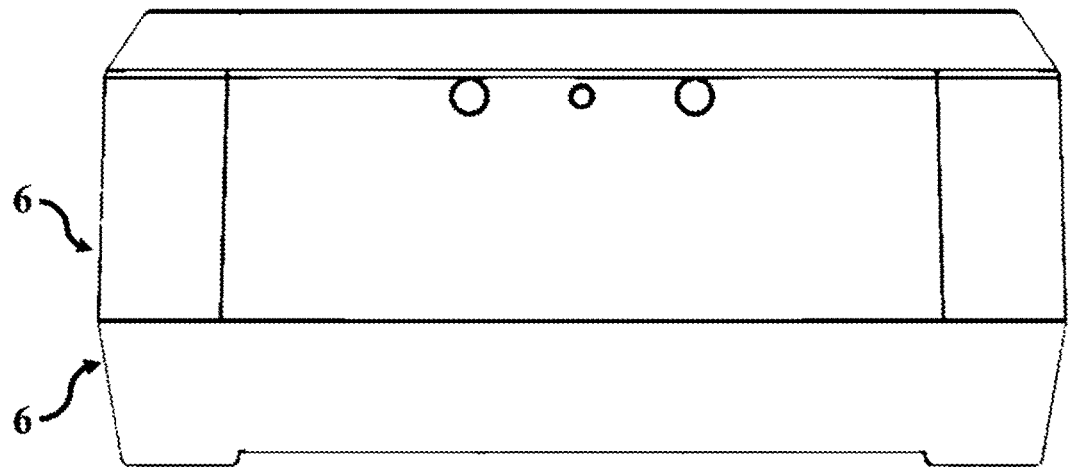
FIGS. 6A-B show front (6A) and side (6B) views of the boundary assembly.
Figure 6B:
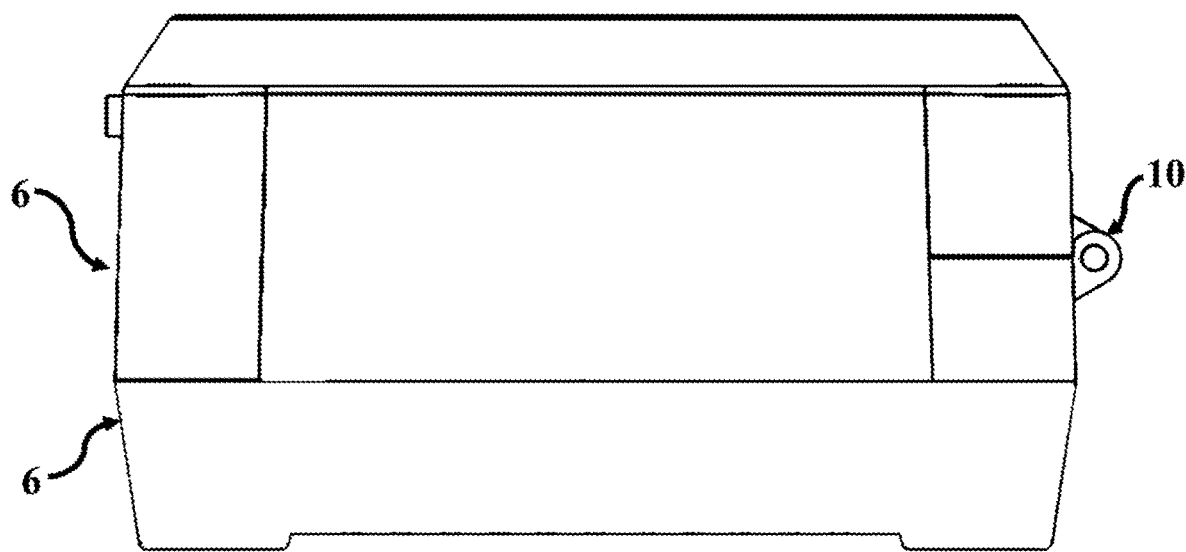
Figure 7:
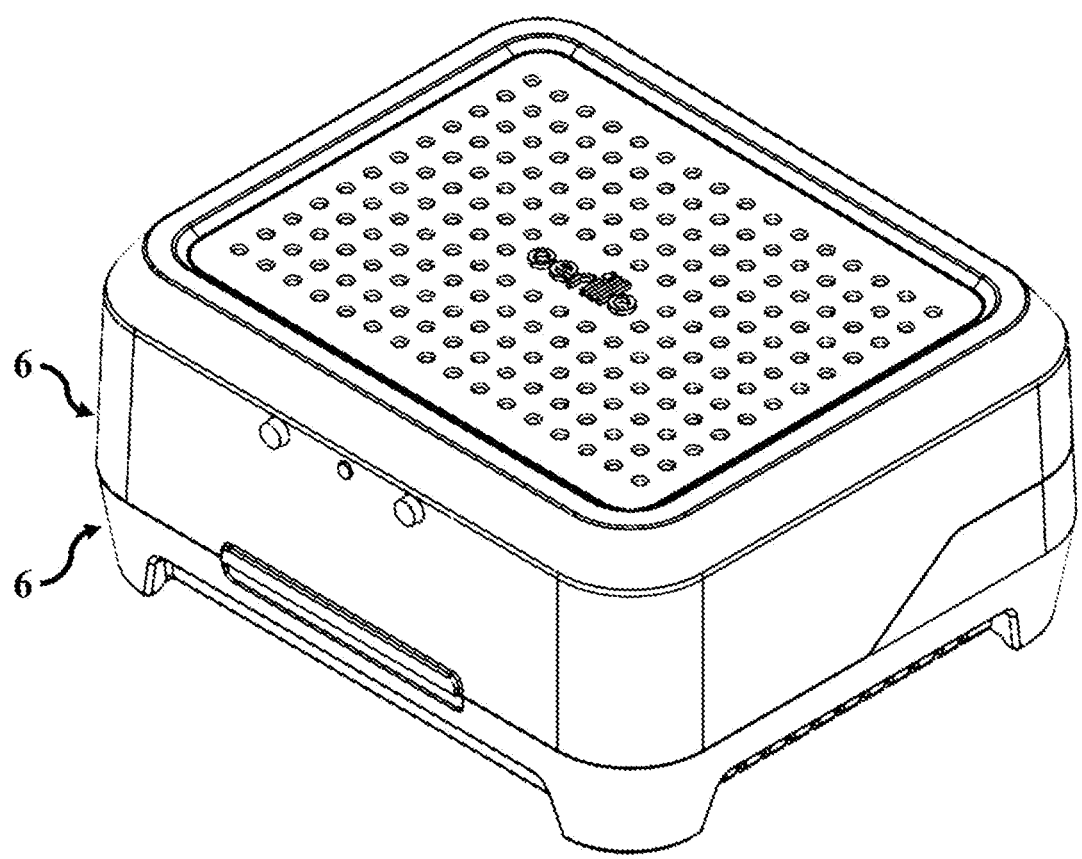
FIG. 7 shows a perspective view of the plate reader, with detail.

In another aspect, the emitter assembly (4), comprises: a printed circuit board onto which the plurality of emitters is attached (see FIG. 5B). In another aspect, the electromagnetic radiation channels are also attached to the emitter assembly printed circuit board.

In another aspect, the receptor assembly (5), comprises: a printed circuit board onto which the plurality of receptors is attached (similar to FIG. 5B). In another aspect, the electromagnetic radiation channels are also attached to the receptor assembly printed circuit board.

In another aspect, the plate reader, further comprises: an internal microcontroller coupled to both the emitter assembly (4) and receptor assembly (5) and an internal memory. The microcontroller directs the light emitters and receptors to function in a predetermined mode, sequence, or pattern. Measurements from receptors are stored digitally in the internal memory and passed through an algorithm to determine the pre-selected measurement of interest to the user. In another aspect, the final measurements are stored to an optional removable memory card and/or streamed out a USB connection to an optional host device (e.g., host computer). In another aspect, the plate reader, further comprises: a Bluetooth chip that allows the reader to receive and/or transmit to an optional host device.

In another aspect, the combination of emitters and receptors allows for the plate reader to be run at low power. For example, the voltage required to operate the plate reader is less than 10, 9, 8, 7, 5, 4, 3, 2, or 1 V. In another example, the maximum current at peak power is less than 200, 175, 150, 125, 100, 75, 50, or 25 mA. In another aspect, due to the low power requirements of the present plate reader, power can be derived from a computer (e.g., via a USB cable) or a battery. In another aspect, the reader, further comprises: a battery compartment. In another aspect, the reader, further comprises: a battery compartment and a battery. In another aspect, the first housing (6), further comprises: a USB port. In another aspect, the second housing, further comprises: a USB port. In another aspect, the first housing, further comprises: a battery compartment. In another aspect, the second housing (6), further comprises: a battery compartment.

Numerous modifications and variations of the present invention are possible considering the above teachings. It is therefore to be understood that within the scope of the appended claims, the invention may be practiced otherwise than as specifically described herein.

We claim:

1. A multi-well plate reader, comprising:
   a an alignment tray configured to securely fasten a multi-well sample plate, the alignment tray, comprising:
      (i) four raised corner pieces, wherein at least one corner piece, comprises: a force-producing element configured to align the sample plate to a single reference point, the force-producing element being a spring-like element, an angular edge, or a combination thereof; and,
      (ii) at least one coupling protrusion or intrusion;
   b an emitter assembly, physically coupled to and in a fixed position relative to the alignment tray, the emitter assembly, comprising: a plurality of electromagnetic emitters arranged to place the emissions of the emitters in optical alignment with each well of the multi-well plate;
   c a second tray, comprising: at least one coupling intrusion or protrusion that corresponds to the at least one coupling protrusion or intrusion on the alignment tray for temporary coupling and alignment of the trays during the plate reader operation;
   d a receptor assembly, physically coupled to and in a fixed position relative to the second tray, the receptor assembly, comprising: a plurality of electromagnetic receptors arranged to place the receptors in alignment with electromagnetic emission that exits each well of the sample plate; and
   e a boundary assembly, comprising:
      (i) a first housing that houses the alignment tray and emitter assembly; and,
      (ii) a second housing that houses the second tray and receptor assembly;
   f a durable coupling attached to the alignment tray and second tray, to both housings, or both, which allows the trays and housings to move relative to one another;
   wherein:
      each emitter is operable to transmit electromagnetic radiation to one or more of the receptors; and,
      both the emitter assembly and receptor assembly are static regarding one another and the sample plate during operation of the plate reader.

2. The multi-well plate reader of claim 1, wherein the multi-well plate for which the reader is designed is a 96-well plate.

3. The multi-well plate reader of claim 1, wherein two of the raised corner pieces are front corner pieces and two are rear corner pieces, wherein the two raised rear corner pieces are connected to form a rear wall.

4. The multi-well plate reader of claim 3, wherein the force-producing element is a spring-like element.

5. The multi-well plate reader of claim 4, wherein the force-producing element is a pair of springy tabs facing inward.

6. The multi-well plate reader of claim 1, further comprising:
   g an adapter;
   wherein the adapter is configured to secure the plate reader to an agitation apparatus.

7. The multi-well plate reader of claim 1, wherein the coupling protrusion, comprises: a combination of pins and a ridge and the coupling instrusion, comprises: a combination of a crevice and holes that correspond to the coupling protrusions of the alignment tray.

8. The multi-well plate reader of claim 3, wherein the corner pieces of the alignment tray, comprise a pin and the rear wall of the alignment tray comprises: a ridge, the pins and ridge forming the coupling protrusion and the second tray, comprises: corresponding holes in its corners and crevice on its rear edge, which form the coupling instrusion.

9. The multi-well plate reader of claim 1, wherein the first housing, comprises: a closed bottom, open top, and sides and houses the alignment tray and emitter assembly and the second housing, comprises: a closed bottom, open top, and sides and houses the second tray and receptor assembly.

10. The multi-well plate reader of claim 1, wherein the durable connection is a hinge.

11. The multi-well plate reader of claim 1, further comprising:
   h a locking mechanism configured to lock the first and second housings during operation of the plate reader.

12. The multi-well plate reader of claim 11, the first housing, comprises a first magnet and the second housing comprises a second magnet.

13. The multi-well plate reader of claim 11, wherein the alignment tray, comprises: a first magnet, the second housing, comprises: a button, comprising: a second magnet.

14. The multi-well plate reader of claim 1, wherein the emitter assembly, comprises: electromagnetic emitters equivalent to the number of wells of the multi-well plate for which the plate reader is designed.

15. The multi-well plate reader of claim 1, wherein the emitter assembly, comprises: 96 emitters.

16. The multi-well plate reader of claim 1, wherein the receptor assembly, comprises: electromagnetic receptors equivalent to the number of wells of the multi-well plate for which the plate reader is designed.

17. The multi-well plate reader of claim 1, wherein the receptor assembly, comprises: 96 receptors.

18. The multi-well plate reader of claim 1, wherein each single emitter is configured to transmit electromagnetic radiation to a corresponding single receptor.

19. The multi-well plate reader of claim 1, wherein the emitters are light emitting diodes (LED).

20. The multi-well plate reader of claim 1, wherein each receptor is capable of measuring light in red, green, blue, and infrared channels.

21. The multi-well plate reader of claim 1, wherein the emitter and receptor assemblies, further comprise: electromagnetic radiation channels.

22. The multi-well plate reader of claim 21, wherein the channels are cylinders.

23. The multi-well plate reader of claim 1, wherein the durable connection is a hinge affixed to both housings.

24. The multi-well plate reader of claim 1, wherein the durable connection is a hinge affixed to both trays.

\* \* \* \* \*